United States Patent [19]

Oddenino

[11] 4,443,917
[45] Apr. 24, 1984

[54] PLASTIC SNAP-HOOK
[75] Inventor: Manrico Oddenino, Turin, Italy
[73] Assignee: ITW Fastex Italia, S.p.A., Turin, Italy
[21] Appl. No.: 372,888
[22] Filed: Apr. 29, 1982
[30] Foreign Application Priority Data
Apr. 29, 1981 [IT] Italy ............... 21426 A/81
[51] Int. Cl.³ ............................. A44B 13/02
[52] U.S. Cl. ........................ 24/239; 24/238; 24/230.5 AD; 24/165; 24/241 SL
[58] Field of Search .......... 24/239, 238, 236, 241 SL, 24/230.5 AD, 230 AK, 371, 374, 375, 318, 319, 312, 343, 370, 373, 201 HE, 225, 165, 230–235

[56] References Cited
U.S. PATENT DOCUMENTS 855,530 6/1907 Reid ................ 24/241 SL
1,771,427 7/1930 Waterhouse ............ 24/238
1,925,816 9/1933 Oster .................. 24/238
2,592,506 4/1952 Yanagihara ............. 24/238

Primary Examiner—Robert Peshock
Assistant Examiner—John G. Weiss
Attorney, Agent, or Firm—J. R. Halvorsen; T. W. Buckman

[57] ABSTRACT

A plastic snap-hook for hooking belts to rings secured to articles of various kind comprises two sections only; one base section, shaped as a strip folded at one end thereof on itself in the form of a hook and folded at the other end on itself as a flexible tongue; and a second section in the form of a slider engaging the lateral edges of said first section and adapted to slide between a closed and an open position of the hook. The flexible tongue tends to bring the slider back in the closed position of the hook when said slider moves from said closed position.

8 Claims, 7 Drawing Figures

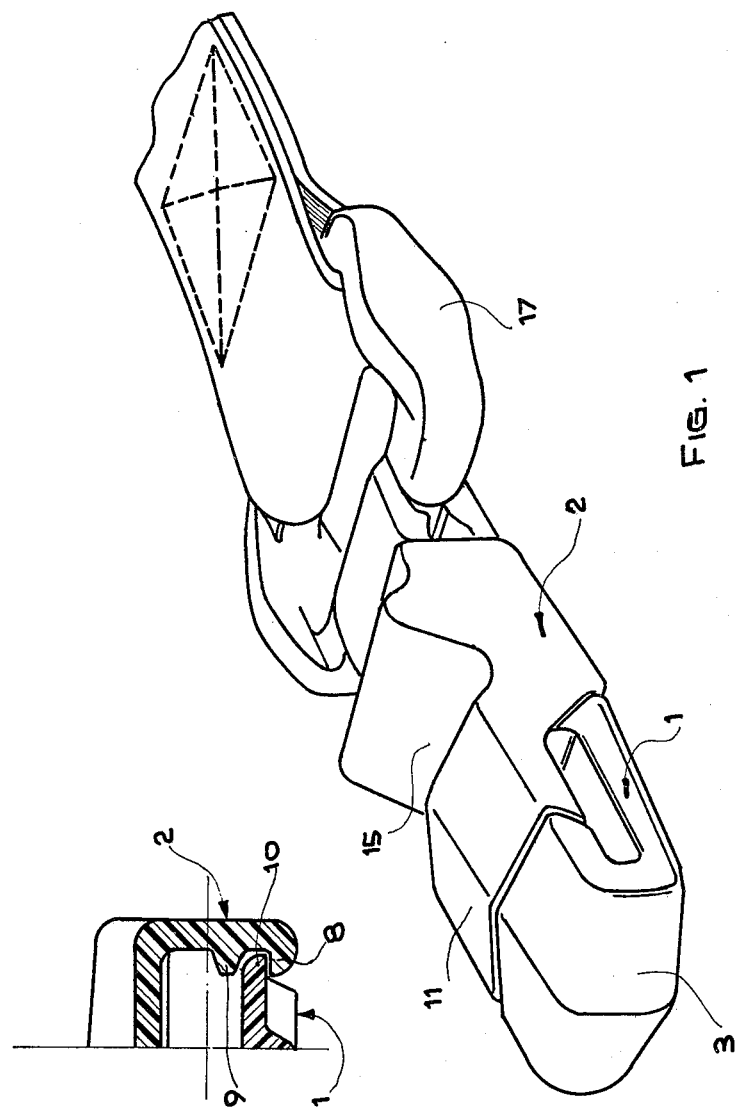

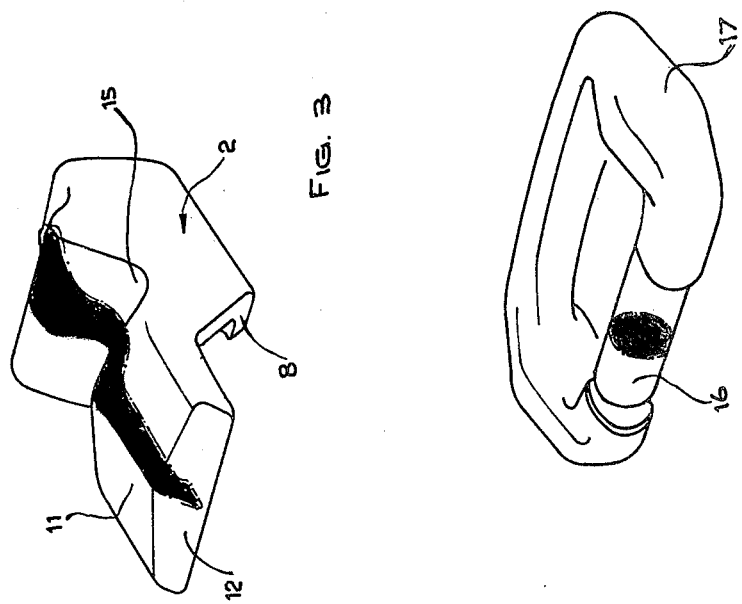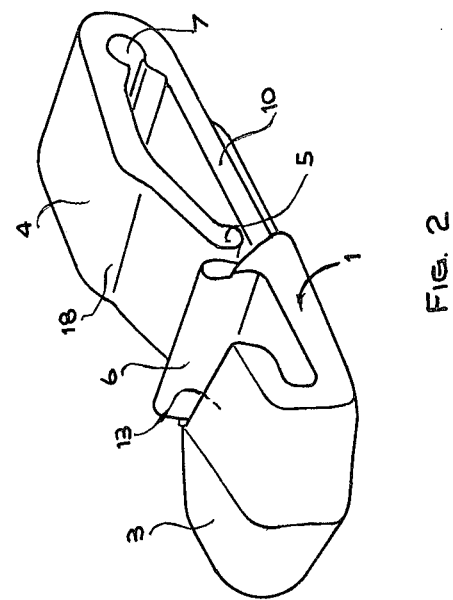

PLASTIC SNAP-HOOK

This invention relates to a snap-hook used for hooking a strap of leather fabric or other materials to a ring secured to articles of various kind, such as handbags, rucksacks, dog-collars.

At present snap-hooks for the above mentioned uses are made of metal and, disregarding the device connecting the snap-hook to the strap, they consist basically of three sections, and more particularly a fixed hook-shaped member; a reciprocating slider for closing the hook, so that the hook is prevented from releasing from the ring secured to the article to be hooked; and a spring member which resiliently biases the slider so as to maintain said slider normally in the closed position of the hook.

A metallic three sections snap-hook of the above mentioned kind is rather complex and costly to manufacture.

Furthermore, it does not lend itself to be manufactured in a large number of alternative embodiments, particularly as far as its shape is concerned, to make it suitable for the articles of several kind for which it is intended.

It is an object of this invention to overcome the above mentioned disadvantages of the known snap-hooks by providing a plastic snap-hook consisting of two sections only, and to manufacture, by means of injection molding, any number of alternative embodiments.

More particularly the snap-hook according to this invention is characterized in that it is made of plastic material and including two sections: a first base section which is shaped as a strip folded at one end thereof on itself in the form of a hook, and folded at the other end on itself as a flexible tongue; and a second section in the form of a slider engaging the lateral edges of said first section and adapted to slide between a closed and an open position of said hook, which second section is urged resiliently by said flexible tongue which tends to bring it back in the closed position of said hook.

The plastic snap-hook according to the invention has the advantage of being substantially less expensive than the known metal snap-hooks; of including two sections only, with the spring being replaced by the flexible tongue integral with the first strip-shaped section; and because of the kind of material it is made of, of being able to be manufactured in a large number of alternative embodiments, so that it better fits the article for which it is intended. For instance in the case the article is a handbag having particular trimmings, it will be possible to design a shape of the snap-hook and a colour of the material of which it is made such as to fit the handbag trimmings.

The invention will be better understood from the following detailed description, given merely by way of example and therefore in no limiting sense, of some embodiments thereof referring to the accompanying drawings, in which:

FIG. 1 is a perspective view of the snap-hook according to the invention, wherein also the ring connecting it to the strap and the strap end are shown;

FIG. 2 is a perspective view of the strip-shaped base section alone;

FIG. 3 is a perspective view of the slider alone;

FIG. 4 is a partial cross-sectional view of the snap-hook taken at the upper cavity of the slider showing the two guide ribs of the slider;

FIG. 5 is a perspective view of the ring connecting the snap-hook to the strap;

Referring to the Figures, the snap-hook according to the invention includes a first strip-shaped base element 1 and a second element 2 in the shape of a slider.

Figure 6:
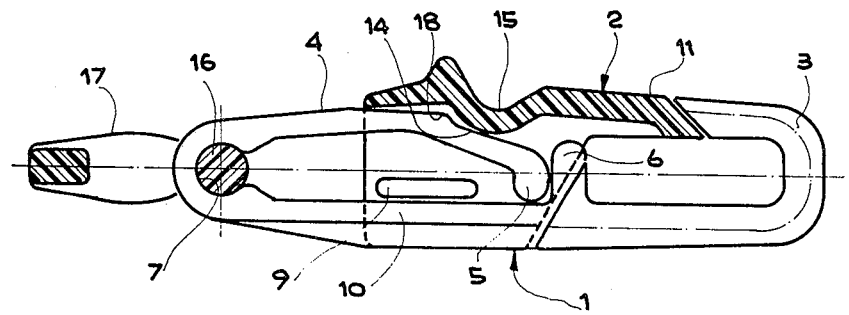
FIG. 6 is a side view of the snap-hook in closed condition with the slider partially broken away so as to show the tongue arrangement.

The strip-shaped base 1 has one end 3 in the form of a hook, while at the other end the strip is folded on itself to form a flexible tongue 4, the free rounded end 5 of which rests, when the snap-hook is assembled, on the base 1, at approximately its center line, laterally to a transversal projection 6. It will be noted in FIG. 6 that the flexible tongue 4 extends generally parallel to the base 1 a substantial portion of its length to a rounded step 18 and then extends downwardly towards base 1 to form an arch.

At its end from which the tongue 4 extends, the base 1 and arm 4 have a bight portion forming an inside cavity 7 in which the ring 17 connecting the snap-hook to the strap is accomodated. FIG. 5 shows an embodiment of said ring 17 adapted to engage the snap-hook according to this invention.

The slider has two pairs of inner lower ribs 8 and 9, between which the lateral edges 10 of the base 1 can slide. The slider 2 has generally a C-shaped cross-section which enables it to enclose the tongue 4 and the lower edges 10 of the body of the strip 1 interconnecting the hook and the tongue, the ribs 8 and 9 being arranged at the lower ends of the two C legs and turned inwardly.

The slider 2 has a projecting portion 11 at the free end of which a sloping surface 12 is provided, which, with the slider 2 in a closed position of the hook, abuts a corresponding sloping surface 13 at the free end of the hook 3.

In addition, the slider 2 is provided with an inwardly turned rounded protuberance 14 which is adapted to engage the top surface of the tongue 4 to distort it resiliently. At the inner rounded protuberance 14, the slider 2 has, on its top outer surface, a cavity 15 which can be engaged by a thumb to move the slider backwardly which is defined as movement in the direction of the bight portion and cavity 7.

The assembling of the two snap-hook sections is very simple. First, the cylindrical section 16 of the ring 17 connecting the snap-hook to the strap must be accommodated in the rounded end 5 of the tongue 4 (by distorting the tongue 4 upwardly) and the lower wall of the base 1. This cylindrical section 16 is then caused to snap inwardly into the cavity 7, by means of a suitable pressure; within said cavity 7 the cylindrical section 16 is rotatable.

At this point, for assembling the snap-hook, the slider 2 must be arranged with its concavity located over and encircling the tongue 4, at an intermediate position between the closed and open positions of the hook 3. Now it is sufficient to press the slider 2 downwardly so that the ribs 8 and 9 pass resiliently beyond the lateral edges of the tongue 4 and the lower ribs snap beyond the lower edges 10 of the base 1, so that said edges 10 lie in the groove formed by the two guide ribs 8 and 9. Now, for the reasons which will be apparent from the following, the slider 2 moves automatically to the closed position of the hook 3, with the surface 12 of the slider 2 mating the surface 13 of the hook 3.

Figure 7:
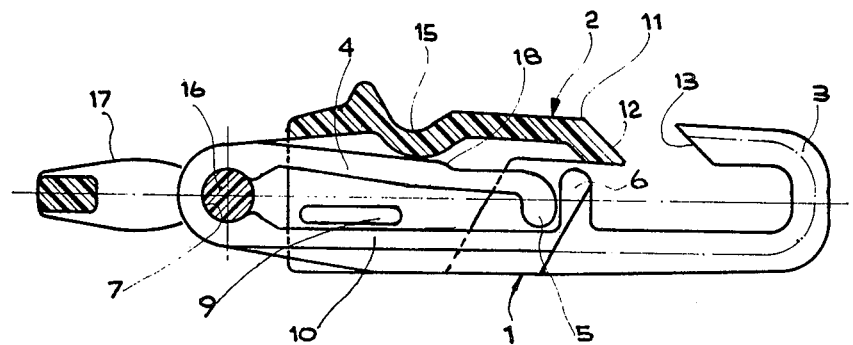
FIG. 7 is a view similar to that of FIG. 6 with the slider in open position.

To open the snap-hook, in order to hook or release the ring secured to the article which it is desired to hook to the snap-hook, it is sufficient to put the thumb in the cavity 15 of the slider 2 and pull back the slider 2 while maintaining the base 1 stationary. The slider 2 moves thus back and opens the hook 3 because its rounded protuberance 14 slides on the top surface of the flexible tongue bending it downwardly and straightening out the arch in tongue 4 (FIG. 7). It should be noted that even in such downwardly bent position of the tongue 4, the portion of the top surface of the tongue 4 contacting the rounded protuberance 14 of the slider 2, has always a slope directed towards the hook, whereby, when the operators's thumb is removed and the slider 2 is left free to move, the tongue 4 returns to its initially arched configuration seen in FIG. 6 and said slider 2 moves back to the closed position of the hook 3.

It should be noted that in the embodiment shown in the Figures, the tongue 4 has on its top surface approximately on the middle of its length, a rounded step 18. The function of this step 18 is to force the rounded protuberance 14 to climb said step 18 when the hook is beginning to open i.e. at the beginning of the movement of the slider 2, whereby said slider 2 finds some resistance to its backward movement. Another function of the step 18 is to cause the movement of the slider 2, because of the existance of the step, to undergo a final acceleration, when said slider 2 is released, so that its sloping surface 12 abuts firmly and by means fo a final snap action the corresponding sloping surface 13 of the hook. It should be further noted that the base portion 1 is substantially wider from the transverse projection 6 towards the end having hook 3 then its width at the opposite end of the base where the tongue is attached. This forms a laterally extending stop means generally adjacent the transverse projection 6 which is engaged by the two downwardly extending "C-legs" of slider 2. This prevents excess movement of the slider which could result in deformation of the extension 11 when its cam surface 12 hits the cam surface 13 of hook 3.

Since the snap-hook, according to the invention, is made of plastic material molded by injection molding and includes two sections only, it is simple to manufacture and assemble and lends itself to be manufactured in a large number of alternative embodiments, particularly as far as the shape thereof is concerned to fit it to the various types of articles for which it can be intended.

While a single embodiment of the invention has been illustrated and described, it is obvious that a number of modifications and changes can be made without departing from the scope of the invention.

I claim:

1. A two-piece locking plastic snap-hook including a first element which is shaped as a strip-like base folded at one end thereof over said base in the form of a hook, and folded at the other end over said base as a flexible arched tongue, said strip-like base serving as an interconnecting body with lateral edges between said overlying hook and tongue; and a second element comprising a channel U-shaped slider having depending legs carrying spaced inward projections which embrace the lateral edges of said first element said slider adapted to slide along a predetermined path between a closed and an open position relative to said hook, said second element having means engaged by said arched tongue with said tongue at an angle to said predetermined path whereby said slider is urged resiliently by said flexible tongue which tends to bring it back to the closed position relative to said hook.

2. The snap-hook of claim 1, characterized in that the slide has an inverted U-shaped configuration with the top portion interior including a rounded protuberance extending inwardly and adapted to engage the top surface of said flexible tongue to bend said tongue resiliently when the slider is moved backwardly away from said hook.

3. The snap-hook of claim 2 characterized in that the top surface of the slider has a depression adapted to be engaged by hand, preferably by the thumb, to move the slider away from said hook and toward the opposite end of said base.

4. The snap-hook of claim 2, characterized in that said tongue is connected to said base by a bight portion and extends from its point of connection to said bight portion in a spaced substantially parallel relation to said base for a substantial portion of its extent and thence angles downwardly toward said base and generally is shaped as an arched leaf spring, the top surface of said tongue contacting said rounded proturberance of said slider having along a substantial portion of its length a slope directed toward said hook whereby the resilient tongue when it attempts to return to its initial arched position causes said slider to move toward said hook to a closed position.

5. The snap-hook of claim 4, characterized in that the free end of said tongue rests on said base a projection on said base which acts as an abutment for the free end of said tongue.

6. The snap-hook of claim 4, characterized in that said tongue has on its top surface, at a point intermediate its length, at a transverse point where said tongue angles downwardly toward said base there is provided a rounded step, said rounded protuberance extending inwardly of said slider being forced to climb said step at the beginning of the backward movement of said slider away from said hook.

7. The snap-hook of claim 1, characterized in that said slider has two grooves one on each leg, each embracing one of the lateral edges of said base, said grooves acting as a guide for the reciprocation of said slider.

8. The snap-hook of claim 1 wherein the portion forming the bight between said base and said tongue includes a transverse rounded cavity adapted to accept a ring member that includes at least one side complimentary to said cavity to permit rotary movement of said side in said cavity.

* * * * *